Patented Sept. 18, 1934

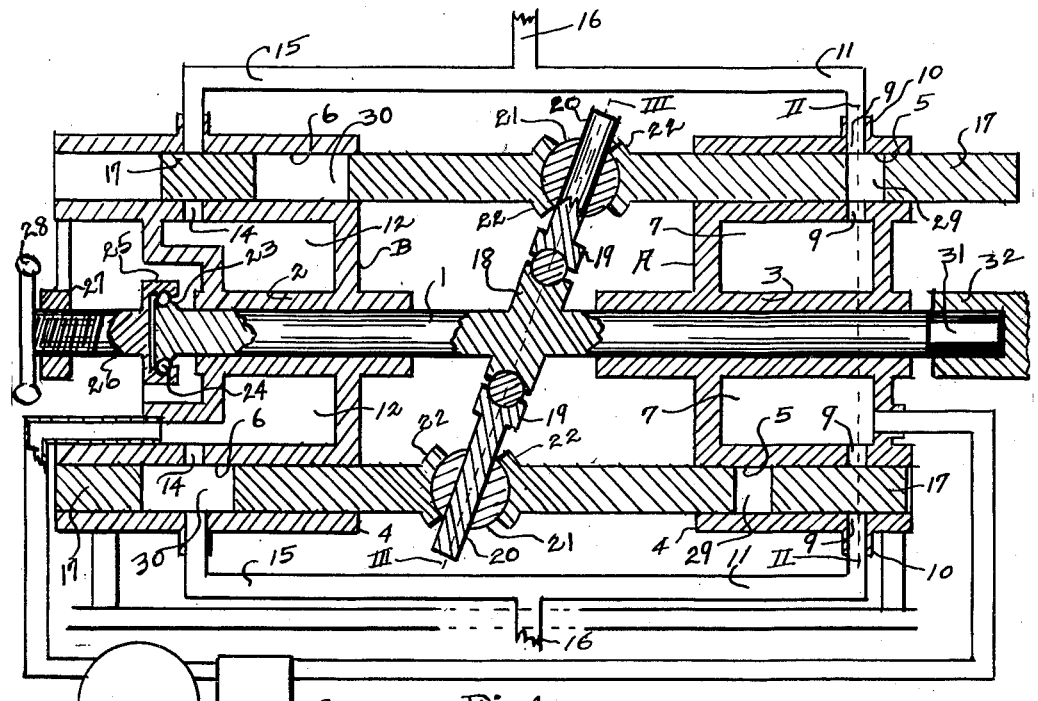
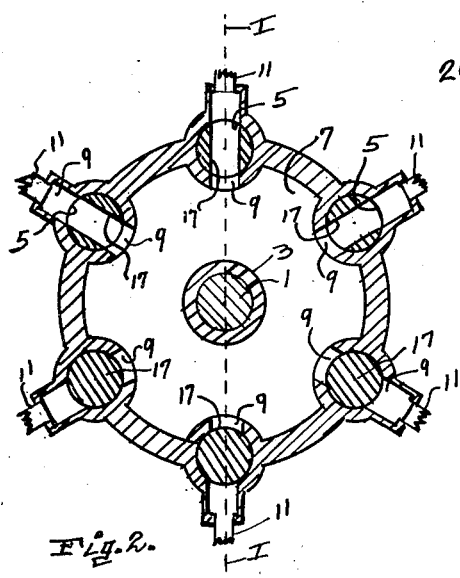
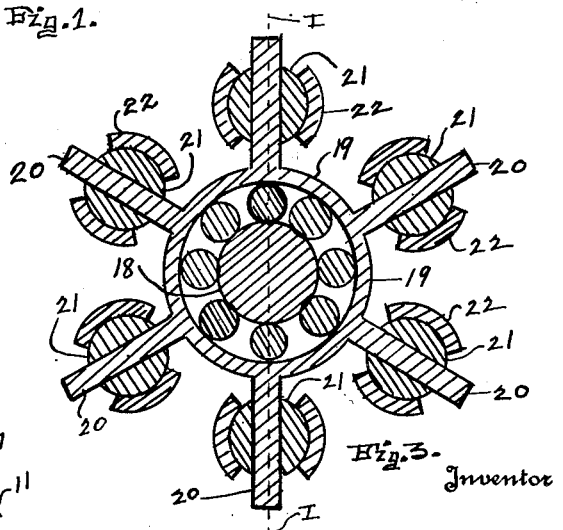

1,973,857

UNITED STATES PATENT OFFICE 1,973,857

RECIPROCABLE PISTON DISTRIBUTING VALVE MEANS

Adolphe C. Peterson, Minneapolis, Minn.

Application May 18, 1931, Serial No. 538,358

18 Claims. (Cl. 137—144)

My invention relates to distributing valve means and particularly to a form of valve for distribution purposes which embodies reciprocable pistons wherefore it is called specifically a reciprocable piston distributing valve means.

The particular objects of my invention are to provide a form of valve means for use particularly in the controlling of elements of an operating mechanism or for controlling the movements of fluids especially in conduits such means being adaptable for use in various mechanisms and devices. The object of my device is particularly to provide a simple form of such distributing valve means for controlling conduits and the communication of such conduits with other conduits or to provide the communication of conduits with chambers or in other connections. An especial object is to provide a form of distributing valve means which in such uses has simplicity in operation and has simplicity in control and flexibility in control.

A particular object of this invention is to provide a novel form of valve distributing means for use in connection with my fuel distributing means described in my patent entitled "Multiple cylinder engine, issued Sept. 29, 1931, Patent Number 1,825,417". In this use the common conduits 16 as hereinafter described would be or correspond to the individual fuel delivery conduits 80 delivering to the individual cylinder fuel nozzles in the said patent. However, I intend my invention for use in connection with other forms of devices particularly in connection with valve operating means where the distributing means as hereinafter described would be useful for the control of the delivery to and release of an operating fluid in connection with a piston or diaphragm valve operating means.

The principal devices and combinations of devices comprising my invention are as hereinafter described and as defined in the claims. In the accompanying drawing which illustrates my invention like characters refer to like parts throughout the several views.

Referring to the drawing:

Figure 1 is a view chiefly in vertical section through the operating axis of my device.

Figure 2 is a cross section at right angles to that of Figure 1, on the line II—II of Figure 1.

Figure 3 is a cross section on the line III—III of Figure 1.

Referring again to the drawing the numeral 1 indicates a rotatable shaft which is the operating shaft of my distributing means and is a shaft which is adapted by any means not shown to be operated by the machine or device to which the distributing valve means is related. The rotatable shaft 1 is mounted rotatably in the bearings 2 and 3 of a so-called casing 4. The casing 4 consists chiefly of a casting or other construction of metal which has two principal parts the valve body A and the valve body B. The valve body A has bored in it a plurality of bores or cylinders 5 each of which is on an axis parallel to the axis of the shaft 1. The valve body B has bored in it a plurality of bores or cylinders 6 each of which is on an axis parallel to the axis of the shaft 1.

The valve body A has centrally disposed in it about the bearing of the shaft 1 an annular chamber 7 which constitutes a so-called pressure chamber for the receiving of a fluid preferably a liquid (depending on the use of the device) under pressure from a source of supply of pressure 8. The annular chamber 7 has as to each bore or cylinder 5 a passage or port 9 which passes from the annular chamber 7 transversely across the bore but is adapted to be closed by the hereinafter described related piston valve. The port 9 by its attached neck 10 is adapted to be attached to or connected with a conduit 11.

The valve body B has centrally disposed in it about the bearing of the shaft 1 an annular chamber 12 which contains or constitutes a so-called relief chamber or low pressure chamber for the receiving of fluid and the discharge of such fluid to a source of supply which may be the supply tank 13 of the pressure supply source or pump 8. The relief chamber 12 is adapted to receive fluid in accordance with the cyclic action of the distributing means by the passage ports 14 and thereby from the individual related conduits 15 whenever the related piston valves permit. The conduit 11 of any bore 5 is permanently in communication and connected with the conduit 15 of the related bore 6. It is to be noted that the bores 5 and 6 are in pairs which are related, the bore 5 and the bore 6 of each pair being situated on the same axis extended therethrough. Each related connected conduit 11 and 15 form together a joint communication with the main related conduit 16. The main related conduit 16 may be any conduit or communication port depending on the use of the device.

Each related pair of bores 5—6 which are on an identical axis has a piston-valve 17 reciprocably mounted in the two bores so that the opposite ends of the piston valve 17 are in and reciprocate in the bores but so that between the bores and between the body A and the body B there is a portion of the piston valve 17 which is exposed and not covered by the bores or valve bodies, this portion being of course variable according to the reciprocation. Thus there are as many piston valves 17 as there are pairs of the bores 5—6 and the related pairs of bores 5—6 are situated preferably about the axis of the shaft 1 equidistantly or radially spaced. The shaft 1 has fixed upon it in the space between the valve body A and valve body B an angularly mounted so-called wabble plate 18 which constitutes the inner race (on its circumference of the so-called wabble outer race 19). The latter has fixed to it a plurality of wabble rods 20, one for each piston valve 17 and each passes reciprocably through a bore in a ball 21 which is mounted and held in its related socket 22, the socket being formed in the mid-portion of the piston valve 17. Thus each piston valve 17 by a ball and socket joint has connection with and is reciprocated by a wabble rod 20 and the piston valves also thereby constitute guides for the wabble race to keep it from rotating while at the same time permitting wabbling freely and free adjustment between the members.

The shaft 1 with its related wabble plate and race is movable axially of the shaft 1 in the latter's bearings by means of a ball race 23 on the end of the shaft 1 balls 24 and the outer race 25 the latter being mounted in the tubular shaft 26. The tubular shaft 26 is screwable as shown in the fixture 27 to provide means for the axial displacement of the tubular shaft 26 and thus the shaft 1 and its related parts by means of the hand wheel 28 attached to the tubular shaft 26. By this means the relative reciprocation of the piston valves 17 in the bores 5 and 6 may be altered so that the piston valves have a greater or less reciprocation in their respective bores and thereby the relation of the reciprocation to the passages governed thereby in the bore is alterable so that the timing of the opening or communication by means of the passage ports is alterable. The rotation of the shaft 1 wabbles the plate and the race and thereby the wabble rods which are slidable in their related ball and socket joints and thereby reciprocate the piston valves 17. At each reciprocation piston ports 29 and 30 of the piston valves are brought into communication with their related passage ports in the bores, this communication depending on the relative reciprocation as governed by the hand wheel. Thereby the relative timing of the communication permitted between each main related conduit 16 and the pressure chamber and the relief chambers which alternately occurs is governable and as the communication period with the pressure chamber is say increased the communication period with the relief chamber is decreased. The shaft 1 is at one end by its hexagonal shaft or part 31 slidable in a hexagonal bore of a driving shaft 32. It is contemplated that the shaft 32 will be a driving shaft operated by any device such as an engine crank shaft with which the device may be associated and so that thereby the shaft 1 and the wabble plate 18 will be driven at a speed properly coordinated by means of the driving shaft 32 with the associated engine or other device.

In the use of my device the wabble outer race 19 is wabbled thereby reciprocating the piston valves 17 so they reciprocate. The relation of reciprocation to the ports in bores 5—6 is controlled by hand wheel 28, so that according to the axial placing of shaft 1 the proportioning of the opening of the ports in bores 5 and 6 may be altered, thereby providing means for varying the degree of the cyclic action in which chamber 7 is in communication with conduit 16 and correspondingly increasing or shortening the degree of the cyclic action in which chamber 12 is in communication with the conduits 16. This communication occurs in cyclic order so that in each cycle of the wabble plate 18 each conduit 16 is successively in communication for a short period which is say twenty five degrees or so with the high pressure chamber and so that in each successive period as to a conduit 16 that conduit 16 is in communication with the low pressure chamber.

The word piston is used in the specification or claims to describe the controlling valves and is used in the sense of a piston which operates as a valve in a valve bore and it does not mean a piston operating as a power piston but merely as a valve and is intended to be as broadly inclusive as the word valve might be if similarly used. The word piston is used because it is a reciprocable valve as a piston is reciprocable.

While I have shown particular devices and combinations of devices in the illustration of my invention I contemplate that other detailed devices and combinations of devices may be used in the realization of my invention.

The so-called primary ports which govern the distribution of fluid under pressure may not necessarily deliver to the common main conduits shown but may deliver to any means whereby the fluid under pressure as cyclically delivered to the primary ports is utilizable, and likewise the secondary ports which govern the release of fluid under pressure through them to the relief chamber may not necessarily control the release of fluid from the main conduits shown but may control the release of fluid under pressure from any means wherein the release of fluid under pressure in accordance with a cyclic relation to the delivery of fluid under pressure (as governed by the primary ports) is needed or advantageous. The intention of the device as stated in the objects is particularly to provide means for governing the delivery of pressure and relief of pressure from any devices, particularly valve operating means.

What I claim is:

1. In a valve means, a driving shaft, a rotatable shaft driven by and axially movable relative to the driving shaft, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element and valve chambers parallel to the axis of the rotatable shaft located about the rotatable shaft on the other side of the bearing element, valve piston elements reciprocable each at one end in one valve chamber and each at the other end in another valve chamber and having reciprocation substantially parallel to the axis of the rotatable shaft, flexible joints between the oscillated element and the several valve piston elements.

2. In a valve means, a driving shaft, a rotatable shaft driven by and axially movable relative to the driving shaft, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element and valve chambers parallel to the axis of the rotatable shaft located about the rotatable shaft on the other side of the bearing element, valve piston elements reciprocable each at one end in one valve chamber and each at the other end in another valve chamber and having reciprocation substantially parallel to the axis of the rotatable shaft, universal joints between the oscillated element and the several valve piston elements.

3. In a valve means, a driving element, a rotatable shaft driven by the driving element, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element and valve chambers parallel to the axis of the rotatable shaft located about the rotatable shaft on the other side of the bearing element, valve piston elements reciprocable each at one end in one valve chamber and each at the other end in another valve chamber and having reciprocation substantially parallel to the axis of the rotatable shaft, flexible joints between the oscillated element and the several valve piston elements.

4. In a valve means, a driving element, a rotatable shaft driven by the driving element, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element, valve chambers parallel to the axis of the rotatable shaft about it and on the other side of the bearing element, valve piston elements reciprocable each at one end in one valve chamber and each at the other end in another valve chamber and having reciprocation substantially parallel to the axis of the rotatable shaft, universal joints between the oscillated element and the several valve piston elements.

5. In a valve means, a driving element, a rotatable shaft driven by the driving element and axially movable relative to the driving element, a bearing element revolvable with and fixed transversely of the rotatable shaft at an angle other than ninety degrees, an oscillated element having bearing on the bearing element, valve chambers parallel to the axis of the rotatable shaft, valve pistons reciprocable in the valve chambers, flexible joints between the valve pistons and the oscillated element, and means for locating the rotatable shaft with its bearing element at variable positions axially of the driving element and a set of primary and secondary ports for each valve piston governable by the reciprocation of the piston.

6. In a valve means, a driving element, a rotatable shaft driven by the driving element and axially movable relative to the driving element, a bearing element revolvable with and fixed transversely of the rotatable shaft at an angle other than ninety degrees, an oscillated element having bearing on the bearing element, valve chambers parallel to the axis of the rotatable shaft, valve pistons reciprocable in the valve chambers, flexible joints between the valve pistons and the oscillatable element, means for locating the rotatable shaft with its bearing element at variable positions axially of the driving element, effecting thereby change in the location of relative reciprocation of the valve pistons.

7. In a valve means, a driving element, a rotatable shaft driven by the driving element, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element, valve chambers parallel to the axis of the rotatable shaft about it and on the other side of the bearing element, valve piston elements reciprocable each at one end in one valve chamber and each at its other end in another valve chamber and having reciprocation substantially parallel to the axis of the rotatable shaft, flexible joints between the oscillatable element and the several valve piston elements, ports one in each valve chamber and governed by one end of one valve piston element.

8. In a valve means, a driving element, a rotatable shaft driven by the driving element, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element, valve chambers parallel to the axis of the rotatable shaft about it and on the other side of the bearing element, valve piston elements reciprocable each at one end in one valve chamber and each at the other end in another valve chamber and having reciprocation substantially parallel to the axis of the rotatable shaft, flexible joints between the several valve pistons and the oscillatable element, ports one in each valve chamber and governed by one end of one valve piston element, and means whereby the rotatable shaft with its bearing element and co-operating valve piston elements is movable axially for alteration of the relation of the valve piston elements in their reciprocation to the ports governed thereby.

9. In a valve means, a driving element, a rotatable shaft driven by the driving element, a bearing element revolvable with and fixed transvarsely of the rotatable shaft at an angle other than ninety degrees, an oscillated element having bearing on the bearing element, valve chambers parallel to the axis of the rotatable shaft located about the rotatable shaft and valve chambers parallel to the axis of the rotatable shaft about it and on the other side of the bearing element, valve piston elements reciprocable each at one end in one valve chamber and each at the other end in another valve chamber and having reciprocation substantially parallel to the axis of the rotatable shaft, flexible joints between the several valve pistons and the oscillatable element, ports one in each valve chamber and governed by one end of the valve piston element, a pressure chamber associated with the valve chambers at one side of the bearing element and adapted to receive fluid under pressure from a pressure creating source, a relief chamber associated with the valve chambers at the other side of the bearing element and adapted to discharge under low pressure to a receiving means, a plurality of communication conduits each having communication by means of the port of one valve chamber with the pressure chamber and having communication by means of the port of another valve chamber with the relief chamber.

10. In a valve means, a driving element, a rotatable shaft driven by the driving element, a bearing element revolvable with and fixed transversely of the rotatable shaft at an angle other than ninety degrees, an oscillated element having bearing on the bearing element, valve chambers parallel to the axis of the rotatable shaft located about the rotatable shaft on one side of the bearing element and valve chambers parallel to the axis of the rotatable shaft about it and on the other side of the bearing element, valve piston elements reciprocable each at one end in one valve chamber and each at its other reciprocable in another valve chamber and having reciprocation substantially parallel to the axis of the rotatable shaft, flexible joints between the several valve piston elements and the oscillatable element, ports one in each valve chamber and governed by one end of the valve piston element, a pressure chamber associated with the valve chambers at one side of the bearing element and adapted to receive fluid under pressure from a pressure creating source, a relief chamber associated with the valve chambers at the other side of the bearing element and adapted to discharge under low pressure to a receiving means, a plurality of communication conduits each having communication by means of the port of one valve chamber with the pressure chamber and having communication by means of the port of another valve chamber with the relief chamber, and means whereby the rotatable shaft with its bearing element and cooperating valve piston elements is movable axially for alteration of the relation of the valve piston elements in their reciprocation to the ports governed thereby.

11. In a distributing means, a rotatable shaft, means whereby the rotatable shaft is driven by a driving element, a primary set of valve bores about the rotatable shaft on axes substantially parallel thereto, a secondary set of valve bores about the rotatable shaft on axes substantially parallel thereto, pistons to reciprocate in the primary bores and adapted to govern passages therein, pistons adapted to reciprocate in the secondary valve bores and adapted to govern passages therein, and actuating means fixed to the rotatable shaft at an angle other than ninety degrees and adapted to actuate the pistons and means whereby the actuating means and its cooperating pistons are shiftable axially for alteration of the reciprocable relation with the valve bores.

12. In a distributing means, a rotatable shaft, means whereby the rotatable shaft is driven by a driving element, a primary set of valve bores about the rotatable shaft on axes substantially parallel thereto, a secondary set of valve bores about the rotatable shaft on axes substantially parallel thereto, pistons adapted to reciprocate in the primary bores and adapted to govern ports therein, pistons adapted to reciprocate in the secondary valve bores and adapted to govern ports therein, actuating means fixed to the rotatable shaft at an angle other than ninety degrees and adapted to actuate the pistons, and means whereby the rotatable shaft is shiftable axially together with its actuating means and the related pistons for variable relation of the reciprocation of the pistons relative to the ports in the primary valve bores and the secondary valve bores.

13. In a distributing means, a rotatable shaft, means whereby the rotatable shaft is driven by a driving element, a primary set of valve bores and a secondary set of valve bores, pistons reciprocable in the primary set of valve bores, pistons reciprocable in the secondary set of valve bores, an actuating means operated by the rotatable shaft for reciprocation of the pistons, and means whereby the actuating means is shiftable axially for variation of the relation of the reciprocation of the reciprocable pistons in their respective primary and secondary valve bores for variation of the relation of the governing of the ports in the primary and secondary valve bores by the reciprocable valve pistons.

14. The means described in claim 13 and a pressure fluid chamber related to one of the said set of valve bores and a relief chamber related to the other of said set of valve bores, and main conduits individually connected each with a port of one primary valve bore and a port of one secondary valve bore.

15. In a distributing means, a rotatable shaft, means whereby the rotatable shaft is driven by a driving element, valve bores axially parallel with the rotatable shaft, pistons reciprocable in the valve bores, an actuating means operated by the rotatable shaft for reciprocation of the pistons, primary ports governed by the pistons for control of the distribution of a fluid under pressure from a pressure source to the primary ports, secondary ports governed by the pistons for control of the release of a fluid pressure to a relief means, and means whereby the actuating means is shiftable axially for variation of the relation of the reciprocation of the reciprocable pistons with relation to the respective primary and secondary ports.

16. In a distributing means, a rotatable shaft, means whereby the rotatable shaft is driven by a driving element, valve bores axially parallel with the rotatable shaft, pistons reciprocable in the valve bores, an actuating means operated by the rotatable shaft for reciprocation of the pistons, a fluid pressure source, primary ports governed by the pistons for control of the distribution of fluid under pressure from the pressure source, a relief means, secondary ports governed by the pistons for control of the release of fluid under pressure to the relief means and means whereby the actuating means and its cooperating pistons are shiftable axially for alteration of the reciprocable relation with the primary and secondary ports.

17. In a valve means, a driving element, valve bores axially parallel with the driving element, pistons reciprocable in the valve bores, an actuating means rotatable with the driving element and adapted to impart a cyclic reciprocation to the valve pistons the reciprocation of each being parallel to the axis of the driving element, each valve bore having a related port governable by the reciprocation of the related piston, and means whereby the actuating means is shiftable axially to alter the location of the reciprocation of the valve pistons relative to the ports.

18. In a distributing means, a rotatable shaft, means whereby the rotatable shaft is driven by a driving element, valve bores axially parallel with the rotatable shaft, pistons reciprocable in the valve bores, an actuating means operated by the rotatable shaft for reciprocation of the pistons, a fluid pressure source, primary ports governed by the pistons for control of the distribution of a fluid under pressure from the pressure source, a relief means, secondary ports governed by the pistons for control of the release of fluid under pressure to the relief means, individual communication conduits each in communication with one primary port and one secondary port, and means whereby the actuating means with its cooperating pistons is shiftable axially for alteration of the reciprocable relation to the primary and secondary ports.

ADOLPHE C. PETERSON.